(12) United States Patent
Muraoka

(10) Patent No.: US 6,175,794 B1
(45) Date of Patent: Jan. 16, 2001

(54) CONTROL UNIT FOR AIR BAG

(75) Inventor: Kunihiko Muraoka, Tokyo-To (JP)

(73) Assignee: Fuji Jukogyo Kabushiki Kaisha, Tokyo (JP)

(*) Notice: Under 35 U.S.C. 154(b), the term of this patent shall be extended for 0 days.

(21) Appl. No.: 09/243,421

(22) Filed: Feb. 3, 1999

(30) Foreign Application Priority Data

Feb. 12, 1998 (JP) ................................................. 10/030019

(51) Int. Cl.[7] ................................................. B60R 21/32
(52) U.S. Cl. ................................. 701/45; 701/29; 701/35
(58) Field of Search ............................... 701/45, 29, 35; 307/9.1, 10.1; 280/728.1, 732, 734, 735

(56) References Cited

U.S. PATENT DOCUMENTS

| | | | |
|---|---|---|---|
| 3,877,720 | * 4/1975 | Upmeier et al. | 280/734 |
| 4,059,822 | * 11/1977 | Toshioka et al. | 280/735 |
| 4,848,792 | * 7/1989 | Breed | 280/734 |
| 5,721,527 | * 2/1998 | Simmons et al. | 340/438 |
| 5,847,472 | * 12/1998 | Byon | 307/10.1 |
| 6,043,566 | * 3/2000 | Bryant et al. | 307/10.1 |

FOREIGN PATENT DOCUMENTS 44 05 255 A1 * 8/1995 (DE).

OTHER PUBLICATIONS

Derwent Abstract; DE 29705400 U1; May 1997.*
Abstract EPO; DE 4107538 A1; Sep. 1992.*

* cited by examiner

Primary Examiner—Michael J. Zanelli
(74) Attorney, Agent, or Firm—Smith, Gambrell & Russell, LLP

(57) ABSTRACT

A control unit 1 for an air bag is arranged between an inflater 2 for the air bag and a power source generating a current for operating the inflater. The control unit 2 includes a storage device 9 for storing information of whether the inflater 2 has been operated or not. A controller 13 is connected with the storage device 9 for supplying current for operating the inflater on the basis of operating information when the storage device 9 does not store the information that the inflater 2 has ever been operated. Warning device 4 is also connected with the storage device 9 for giving a warning when the storage device 9 stores information that the inflater has been previously operated. The storage device 9 stores the inflation information when the control unit 1 supplies current to the inflater 2 and operates it. The control unit 1 drives the warning device 4 if it detects the inflation information in the storage device 9 when setting the inflation. Any reuse of the control unit 21 after the inflation can thus be prevented. This improves reliability of the air bag system.

5 Claims, 6 Drawing Sheets

CONTROL UNIT FOR AIR BAG

BACKGROUND OF THE INVENTION

1. Field of the Invention

The present invention relates to a control unit for an air bag and, in particular, to the control unit for the air bag which increases reliability of an operation of the air bag.

2. Description of the Related Art

In conventional air bag systems, an inflater and a control unit are housed in separated cases, and are connected with each other through a connector or the like. Such a conventional control unit after an inflation of the air bag is not different in appearance from the same before the inflation if it is separated from the inflater. This may lead to reuse of the control unit that has ever operated the inflater.

In the control unit, large electric current may flow when the inflater is ignited. The switch devices or the like therein may be damaged with the large electric currents. This means that the used control unit (i. e. the control unit which has ever made inflater operate) has only little reliability.

A memory unit for the air bag system is disclosed in Japanese Patent Laid-Open No. 18336 in 1997. The memory unit comprises a non-volatile memory device, and a microcomputer which can write acceleration data at certain intervals for the latest certain period into the non-volatile memory device when the air bag is inflated and which can then put the memory device under a ban on writing. According to the art, it is possible to know from the acceleration data written in the memory unit whether the inflation of the air bag was performed normally or abnormally. Additionally, it is possible to also know the delay time between the detection of the certain acceleration and the inflation of the air bag, if any.

However, the control unit for the air bag with the above memory unit after the inflation of the air bag is not different in appearance from the same before the inflation if it is separated from the inflater. This may lead to reuse of the used control unit that has ever operated the inflater.

As measures to prevent reuse of the control units after the inflation, there are operation manuals distributed by manufacturers, which tell operators not to reuse the control units.

However, only operators removing the control unit from the car can know whether it has made inflater operate or not. Therefore, it is possible for the control unit after the inflation to be on the market.

SUMMARY OF THE INVENTION

The object of the present invention is to provide a control unit for an air bag which ensures prevention of the reuse thereof and to increase the reliability of the air bag.

In order to achieve the object, the control unit for the air bag according to the present invention, which is arranged between an inflater for the air bag and a power source generating a current for operating the inflater, comprises: storage means for storing an information of whether the inflater has been operated or not; a controller connected with the storage means for supplying a current for operating the inflater to the inflater on the basis of an operating information when the storage means do not store the information that the inflater has ever been operated; and warning means connected with the storage means for giving a warning when the storage means store the information that the inflater has ever been operated.

The controller may preferably be connected with a sensor for detecting an acceleration, which can give an operating information to the controller.

The controller may also be connected with an outside control unit having input means to give an operating information to the controller.

The storage means may comprise non-volatile storage means, preferably an EE-PROM which an information can be electrically written into and erased from.

The warning means may preferably be put on an instrument panel of a car.

According to the present invention, the storage means of the control unit for the air bag stores the inflation information, which indicates that the inflater has been operated, when the control unit supplies the current to the inflater and operates it. The control unit drives the warning means if it detects the inflation information in the storage means when setting the inflation. Any reuse of the control unit after the inflation can thus be prevented. This improves the reliability of the air bag system.

DESCRIPTION OF THE PREFERRED EMBODIMENTS

Embodiments of the present invention will now be described in more detail with reference to the drawings.

Figure 1:
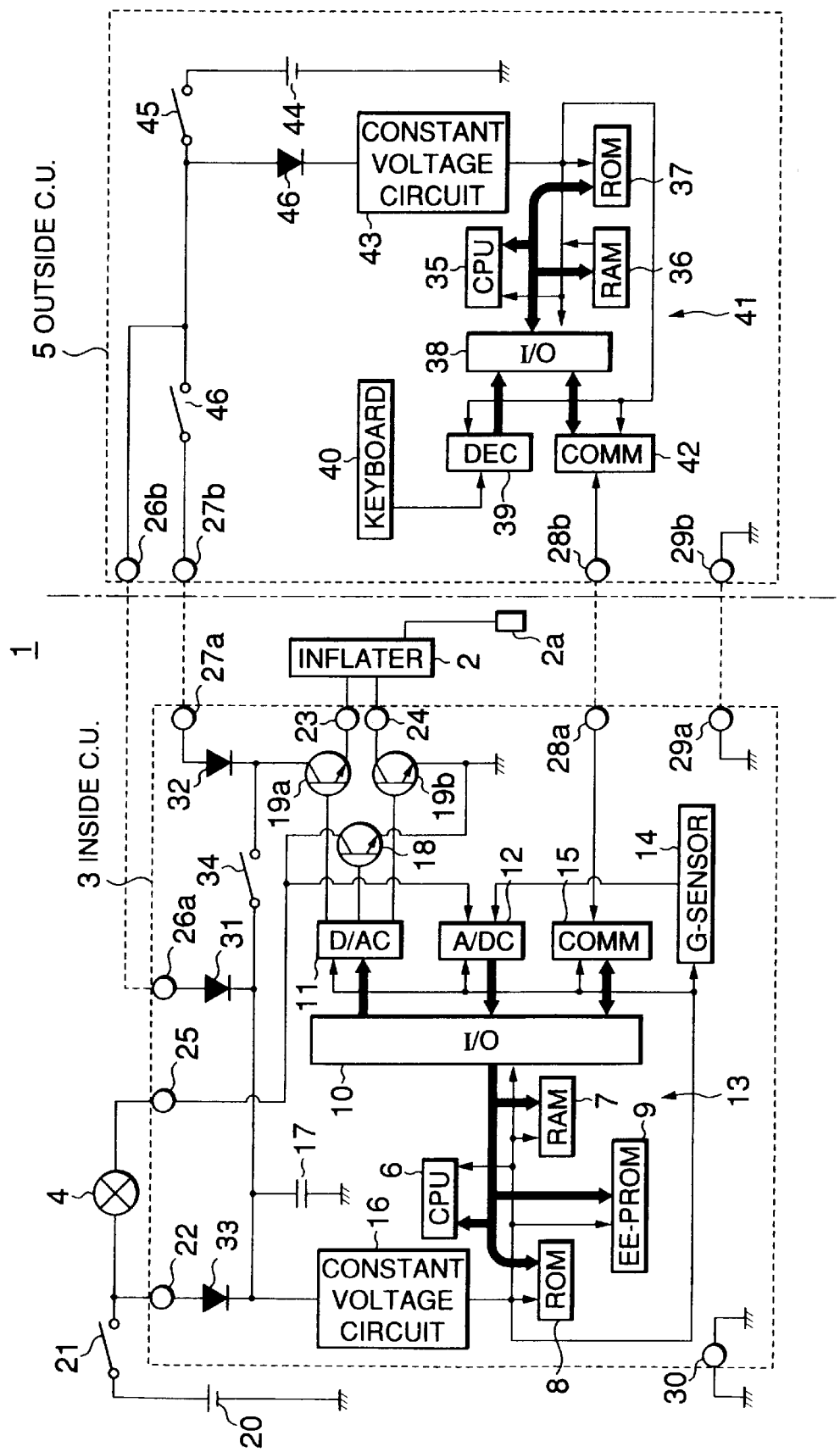
FIG. 1 is a schematic block diagram showing circuits of a control unit for an air bag in an embodiment of the present invention.

As shown in FIG. 1, a control unit 1 for an air bag comprises: an air bag 2a disposed at a fixed position in a car; an inflater 2 associated with the air bag for inflating the air bag; an inside control unit 3; a warning lamp 4, as an example of warning means, for warning operators on the basis of a signal from the inside control unit 3; an outside control unit 5 connectable with the inside control unit 3 for discarding the air bag if it has not been inflated.

The inside control unit 3 functions to ignite and operate the inflater 2 responsive to an acceleration of the car or to a signal from the outside control unit 5 in order to inflate the air bag. The inside control unit 3 is also adapted to operate the warning lamp 4 to warn the operators if the inside control unit 3 has ever operated the inflaters 2.

The inside control unit 3 comprises: a micro controller 13 having components such as a CPU 6, a RAM 7, a ROM 8, a non-volatile EE-PROM 9, an I/O device 10, a D/A converter (D/AC) 11 and an A/D converter (A/DC) 12 which are mutually connected through bus lines; a sensor for detecting an acceleration of the car (G-sensor) 14; circuits for communications (COMM) 15; a constant voltage circuit 16; a backup super capacitor 17; a NPN transistor 18 as a monitor switch for driving the warning lamp 4; and a pair of NPN transistors 19a, 19b as an inflater current switches.

The inside control unit 3 is also provided with: a connector 22 for connecting with a battery 20 placed in the car via an ignition switch 21; connectors 23 and 24 for connecting with the inflater 2; a connector 25 for connecting with the warning lamp 4; connectors 26a, 27a, 28a and 29a for connecting with the outside control unit 5 via cables; and a connector 30 for connecting with the ground.

The connector 22 is connected with the constant voltage circuit 16 via a diode 33. The electric power from the battery 20 is converted into a predetermined constant voltage by the circuit 16 and is supplied into the micro controller 13 (the CPU 6, the RAM 7, the ROM 8, the EE-PROM 9, the I/O device 10, the D/A converter 11 and the A/D converter 12), the sensor 14 for detecting acceleration and the circuits 15 for the communications.

A signal corresponding to acceleration of the car is adapted to be inputted from the sensor 14 into the I/O device 10 in the micro controller 13 connected with the sensor 14 through the A/D converter 12. A control signal from the outside control unit 5 is also adapted to be inputted into the I/O device 10 through the circuits 15 and the connector 28a connected with the outside control unit 5 via bus lines.

The D/A converter 11 in the micro controller 13 is connected with the bases of the transistors 18, 19 and 19a, respectively.

The micro controller 13 is adapted to output an operating signal to the bases of the transistors 19a and 19b to ignite the inflater 2 when the micro controller 13 decides the operation of the air bag on the basis of the acceleration signal from the sensor 14 or the control signal from the outside control unit 5 The EE-PROM 9 is adapted to store (be written) data indicating the acceleration of the car and the ignition of the inflater 2 or the like at that time. The micro controller 13 is adapted to output an operating signal to the base of the transistor 18 to drive (light) the warning lamp 4 when the micro controller 13 detects inflation data, which indicates that the inflater 2 has been operated.

The connector 22 is connected with the collector of the transistor 19a, through the diode 33, the backup super capacitor 17 and a safety sensor 34 which is an electromechanical type of the acceleration switch to prevent electric current from flowing due to an abnormal operation of the control unit. The emitter of the transistor 19a is connected with the inflater 2 via the connector 23.

The connector 24 connected with the inflater 2 is connected with the collector of the transistor 19b. The emitter of the transistor 19b is connected with the ground.

The transistors 19a, 19b are adapted to operate and ignite the inflater 2 to inflate the air bag when the micro controller 13 inputs the operating signal to the bases of the transistors 19a, 19b.

The connectors 26a, 27a are used to supply electric power from the outside control unit 5 into the inside control unit 3. The connector 26a is connected with the constant voltage circuit 16 through a diode 31 and the backup super capacitor 17. The connector 27a is connected with the collector of the transistor 19a through a diode 32. In this manner that the inside control unit 3 is connected with the outside control unit 5, the electric power from the outside control unit 5 can be supplied into the micro controller 13, the sensor 14 and the circuit 15 in the inside control unit 3 through the connector 26a and into the inflater 2 through the connector 27a even when the ignition switch 21 is off.

The connector 29a is used to connect the ground in the control unit 3 with the ground in the control unit 5.

The battery 20 is connected with a terminal of the warning lamp 4 through the ignition switch 21. A connector 25 is connected with the other terminal of the warning lamp 4. The warning lamp 4 is preferably an air bag warning lamp put on an instrument panel or the like in order to warn effectively drivers or operators dealing with the air bag.

The connector 25 is connected with the A/D converter 12 and the collector of the transistor 18.

The emitter of the transistor 18 is connected with the ground. The transistor 18 operates to light up the warning lamp 4 when the micro controller 13 inputs an operating signal into the base of the transistor 18.

On the other hand, the outside control unit 5 can be placed outside of the car. The outside control unit 5 comprises: a micro controller 41 having components such as a CPU 35, a RAM 36, a ROM 37, an I/O device 38, a keyboard decoder (DEC) 39 and a keyboard 40 which are mutually connected through bus lines; circuits 42 for communications; a constant voltage circuit 43; and a battery 44. The outside control unit 5 is also provided with: warning means (not shown) for warning operators an abnormal state of the outside control unit 5 or a mistake in a procedure for discarding the air bag or the like; and displaying means (not shown) for displaying information about the ignition of the inflater 2.

The outside control unit 5 is also provided with connectors 26b, 27b, 28b and 29b which can be connected with the connectors 26a, 27a, 28a and 29a in the inside control unit 3 through the cables, respectively.

The battery 44 is connected with the constant voltage circuit 43 via a main switch 45 and a diode 46 in the outside control unit 5. The electric power from the battery 44 is converted into a predetermined constant voltage by the circuit 43 and is supplied into the micro controller 41 (the CPU 35, the RAM 36, the ROM 37, the I/O device 38 and the keyboard decoder 39) and the circuits 42 for the communications.

The I/O device 38 in the micro controller 41 is connected with the circuit 42 through the bus line. The circuit 42 is connected with the connector 28b. Thus the outside control unit 5 and the inside control unit 3 can send and receive control signals to and from each other by the circuit 42 and the circuit 15.

The battery 44 is also connected with the connector 26b through the main switch 45. The battery 44 is also connected with the connector 27b through the main switch 45 and a normally-open switch 46. Thus the electric power can be supplied to the micro controller 13, the sensor 14 and the circuit 15 in the inside control unit 3 through the connector 26b and to the inflater 2 through the connector 27b. The normally-open switch 46 prevents non-intended supply of electric power from the battery 44 to the inflater 2 due to an abnormal operation.

The connector 29b is used to connect the ground in the control unit 5 with the ground in the control unit 3.

Controlling steps by the inside control unit 3 will be described hereafter.

Figure 2:
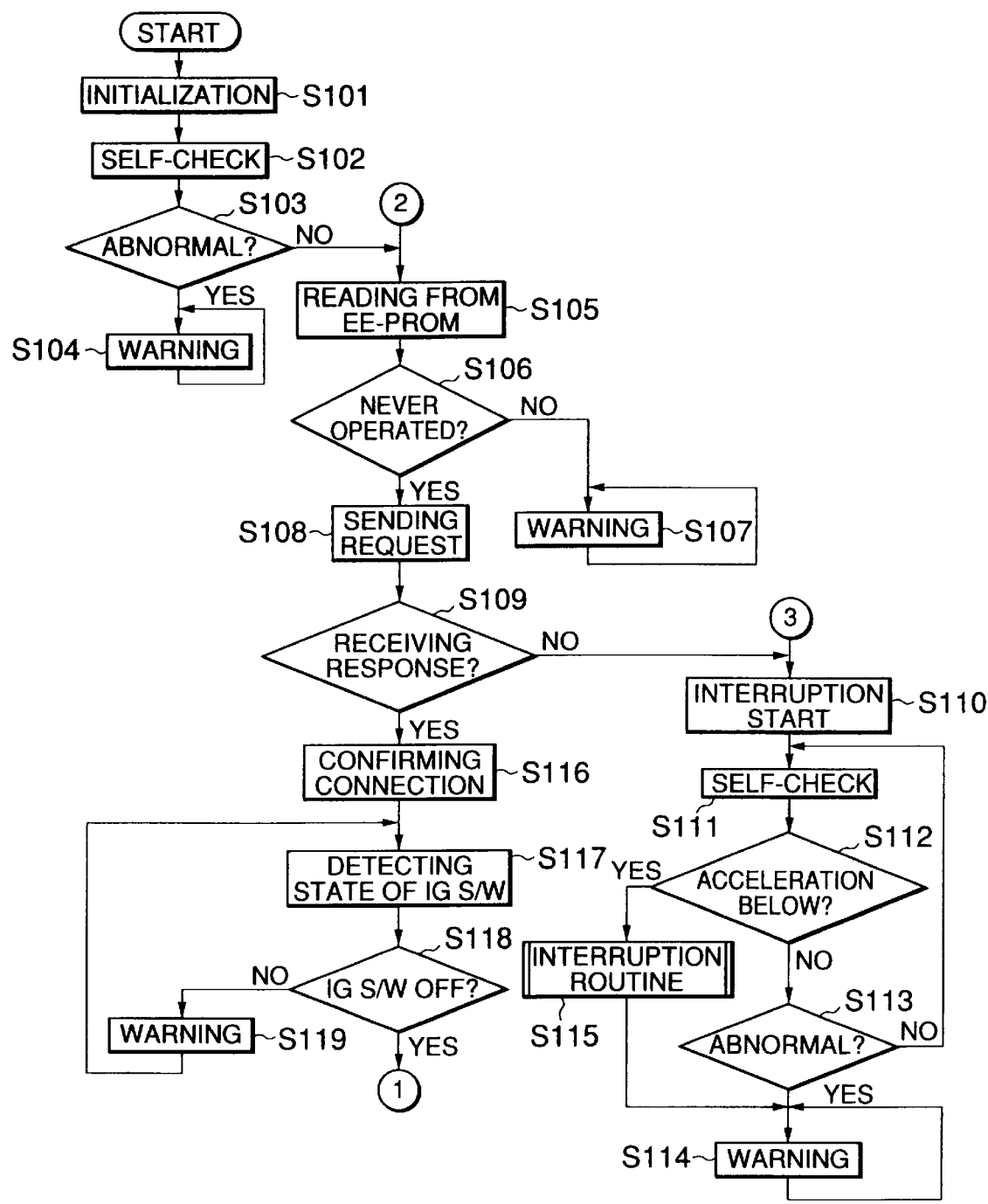
FIGS. 2 and 3 are flow charts of an operation of an inside control unit in the control unit shown in FIG. 1.
Figure 3:
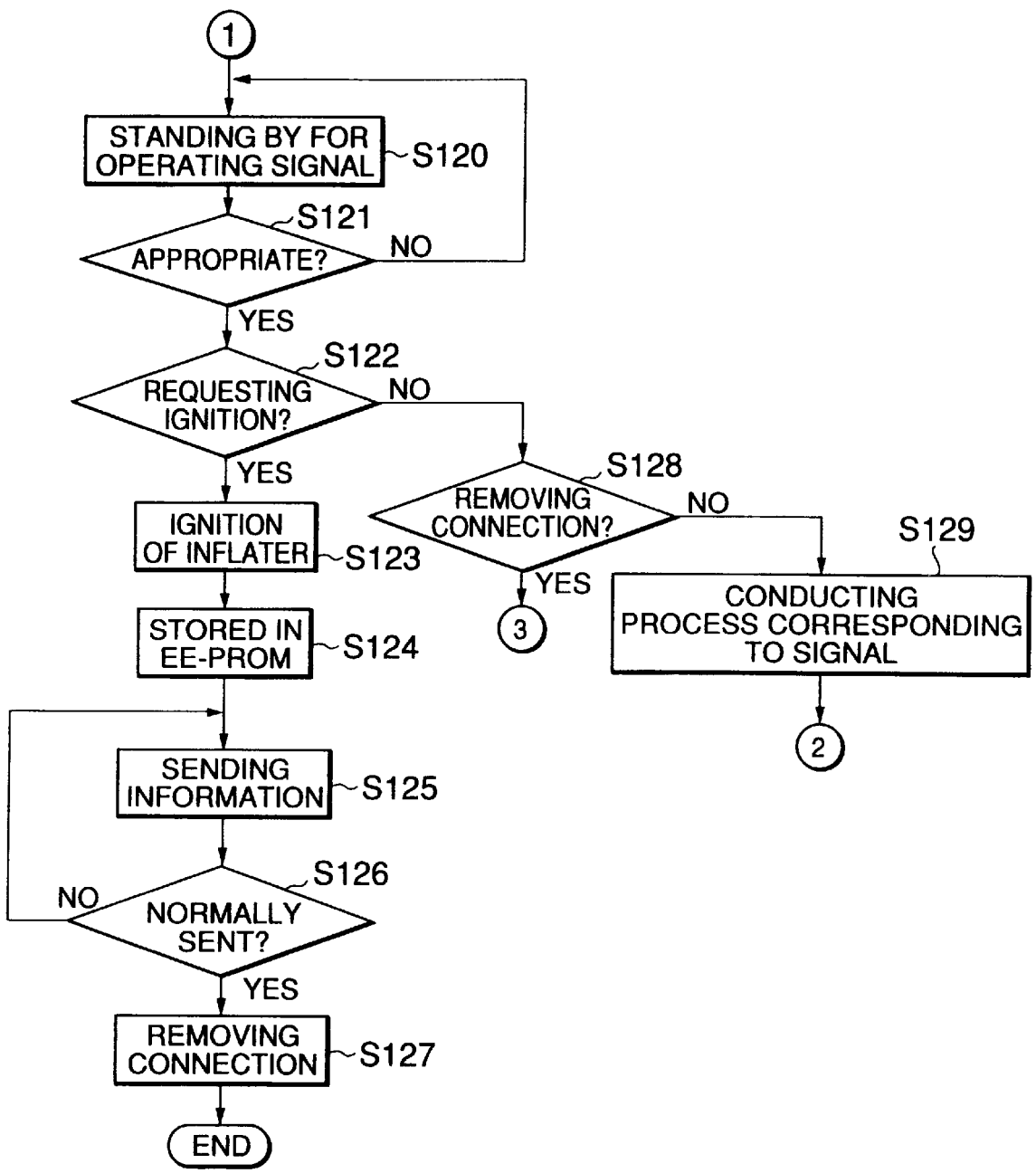

As shown in FIGS. 2 and 3, the control unit 3 is initialized at the first step S101, where the ignition switch 21 is on, or where the outside control unit 5 is connected with the inside control unit 3 and the main switch 45 in the outside control unit 5 is on. The inside control unit 3 conducts a self-check program for detecting any abnormalities thereof at the next step S102. The inside control unit 3 judges the result of the self-check program at the next step S103.

If any abnormality is detected at the step S103, the inside control unit 3 makes the transistor 18 on in order to light up the warning lamp 4 at a step S104. The step S104 is repeated as a loop.

If no abnormality is detected at the step S103, the inside control unit 3 reads the data which indicates whether the inflater 2 has ever been operated, from the EE-PROM 9 at a step S105.

The control unit 3 judges the read data at a step S106.

If the read data indicates that the inflater 2 has ever been ignited and operated at the step S106, the inside control unit 3 makes the transistor 18 on in order to light up the warning lamp 4 at a step S107. The step S107 is repeated as a loop. Thus operators can know that this inside control unit 3 cannot be used.

If the ignition data indicates that the inflater 2 has never been ignited and operated at the step S106, the inside control unit 3 sends a request signal to the outside control unit 5 through the circuit 15 at a step S108.

Then the inside control unit 3 judges whether the outside control unit 5 sends back a response signal corresponding to the request signal to the inside control unit 3 at a step S109.

If the inside control unit 3 does not receive the signal from the outside control unit 5 at the step S109, the inside control unit 3 conducts an interruption pro-ram at a step S110. By conducting the interruption program, the inflater 2 is set to be ignited when the sensor 14 detects an acceleration below a certain value. The inside control unit 3 conducts another self-check program for detecting conditions for igniting the inflater 2 on the basis of a position of the driver or the like and for detecting any abnormality thereof at the next step S111. The inside control unit 3 judges whether the acceleration of the car detected by the sensor 14 is below a certain value at the next step S112.

If the detected acceleration is not below a certain value at the step S112, the inside control unit 3 judges the result of the self-check program at a step S113. If any abnormality is detected at the step S113, the inside control unit 3 makes the warning lamp 4 on at a step S114. The step S114 is repeated as a loop. If no abnormality is detected at the step S113, the inside control unit 3 repeats the steps from the step S111.

If the detected acceleration is below a certain value at the step S112, the inside control unit 3 conducts an interruption routine at a step S115. After the step S115, the step S114 is conducted.

Figure 4:
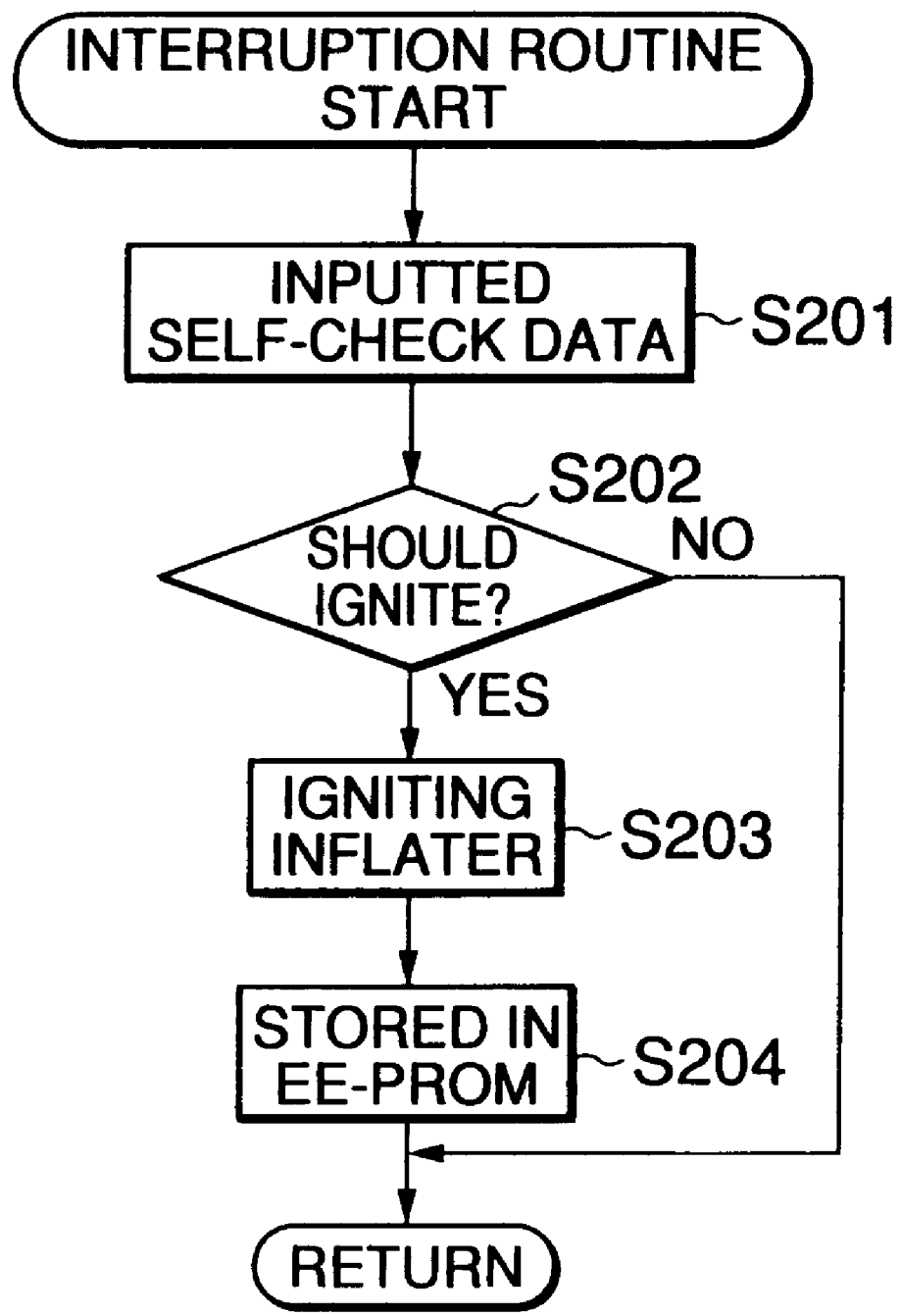
FIG. 4 is a flow chart of an interruption operation of the inside control unit in the control unit shown in FIG. 1.

As shown in FIG. 4, in the interruption routine, the inside control unit 3 is inputted a self-check data at a step S201 and judges whether the inflater 2 should be ignited on the basis of the self-check data at the next step S202. If the inflater 2 should not be ignited at the step S202, the interruption routine is finished. If the inflater 2 should be ignited at the step S202, the inside control unit 3 makes transistors 19*a*, 19*b* on in order to ignite the inflater 2 at a step S203. Then the inside control unit 3 makes the EE-PROM 9 store the ignition information indicating that the inflater 2 has been ignited and the interruption routine is finished.

If the inside control unit 3 receives the signal from the outside control unit 5 at the step S109, the inside control unit 3 confirms the connection of the inside control unit 3 and the outside control unit 5 at a step S116. The inside control unit 3 detects the state of the ignition switch 21 to judge whether the process for discarding the air bag is normally conducted at a step S117.

If the ignition switch 21 is on at the next step S118, the inside control unit 3 gives an alarm for mistakes in operating the air bag at a step S119.

If the ignition switch 21 is off at the step S118, the inside control unit 3 stands by for an operating control signal inputted from the outside control unit 5 at a step S120 (see FIG. 3).

If the operating control signal is inputted to the inside control unit 3 at the step S120, the inside control unit 3 judges whether the operating control signal is appropriate at a step S121. If the operating control signal is not appropriate at the step S121, the inside control unit 3 repeats the steps from the step S120. If the operating control signal is appropriate at the step S121, the inside control unit 3 judges whether the operating control signal is a signal for requesting an ignition of the inflater 2 at a step S122.

If the operating control signal is not a signal for requesting the ignition of the inflater 2 at the step S122, the inside control unit 3 judges whether the operating control signal is a signal for removing the connection between the inside control unit 3 and the outside control unit 5 at a step S128. If the operating control signal is a signal for removing the connection at the step S128, the inside control unit 3 repeats the steps from the step S110. If the operating control signal is not a signal for removing the connection at the step S128, the inside control unit 3 conducts a process corresponding to the signal at a step S129 and repeats the steps from the step S105.

If the operating control signal is a signal for requesting the ignition of the inflater 2 at the step S122, the inside control unit 3 makes transistors 19*a*, 19*b* on in order to ignite the inflater 2 at a step S123. The inside control unit 3 makes the EE-PROM 9 store the ignition information indicating that the inflater 2 has been ignited at the next step S124. The inside control unit 3 sends the ignition information to the outside control unit 5 at the next step S125. The outside control unit 5 judges whether the ignition information is normally sent at the next step S126. If the ignition information is not normally sent, the inside control unit 3 repeats the steps from the step S125. If the ignition information is normally sent, the connection between the inside control unit 3 and the outside control unit 5 is removed at a step 127. Thus the controlling steps are finished.

Controlling steps by the outside control unit 5 will be described hereafter.

Figure 5:
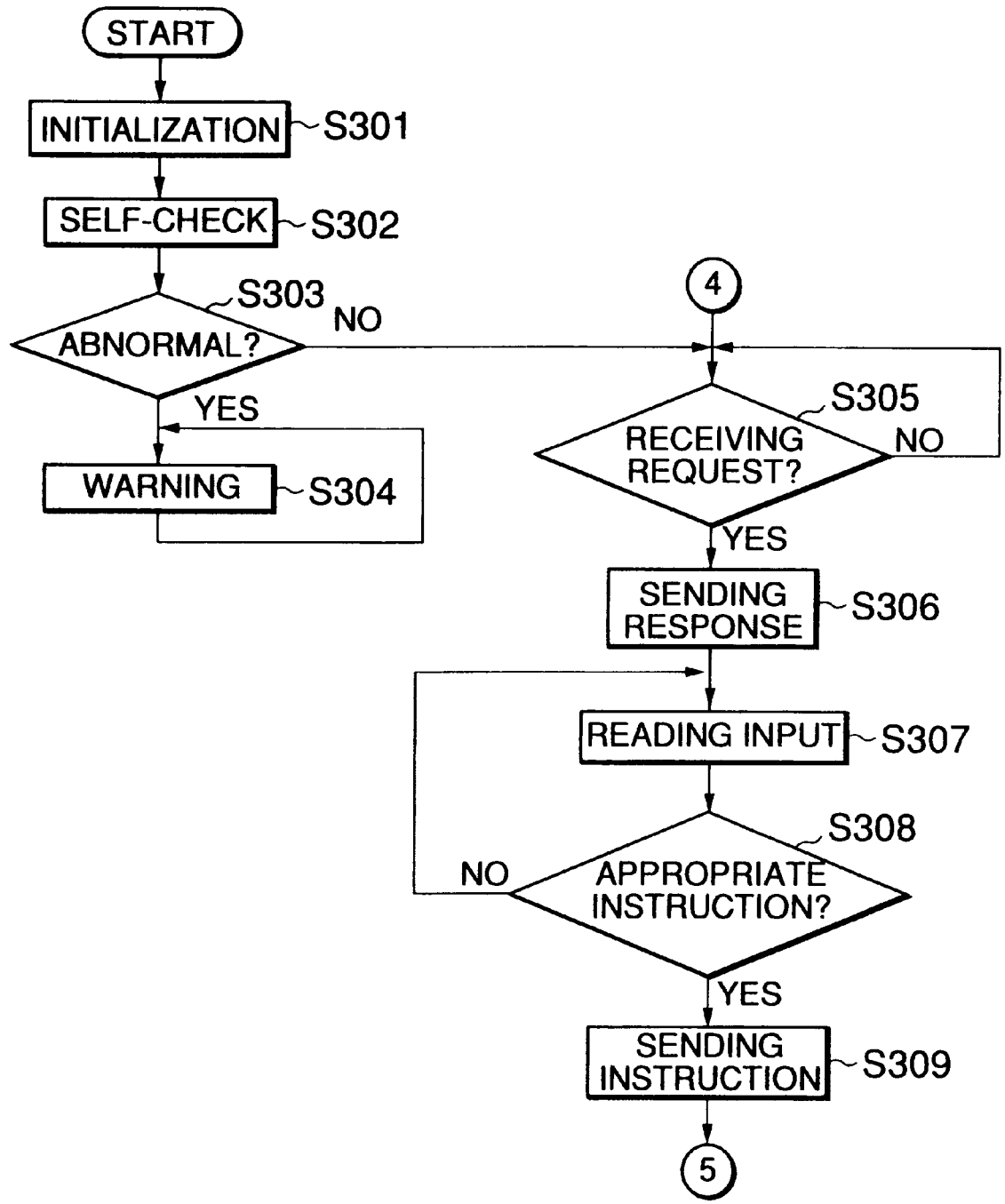
FIGS. 5 and 6 are flow charts of an operation of an outside control unit in the control unit shown in FIG. 1.

As shown in FIG. 5, the outside control unit 5 is initialized at the first step S301 where the connectors 26*b*, 27*b*, 28*b*, 29*b* in the outside control unit 5 are connected with the connectors 26*a*, 27*a*, 28*a*, 29*a* in the inside control unit and the main switch 45 in the outside control unit 5 is turned on to supply the electric power. The outside control unit 5 conducts a self-check program for detecting any abnormality thereof at the next step S302. The outside control unit 5 judges the result of the self-check program at the next step S303.

If any abnormality is detected at the step S303, the outside control unit 5 operates warning means (not shown) to give an alarm at a step S304. The step S304 is repeated as a loop.

If no abnormality is detected at the step S303, the outside control unit 5 stands by a request signal from the inside control unit 3 at a step S305. If the outside control unit 5 receives the request signal, the outside control unit 5 sends back a response signal corresponding to the request signal to the inside control unit 3 at a step S306 in order to confirm the connection. Then the outside control unit 5 reads an input from the keyboard 40 by an operator at a step S307. The outside control unit 5 judges whether the input is an appropriate instruction at the next step S308. If the input is not the appropriate instruction, the outside control unit 5 requests a reinput and repeats the steps from the step S307. If the input is the appropriate instruction, the outside control unit 5 sends the instruction to the inside control unit 3 at a step S309.

Figure 6:
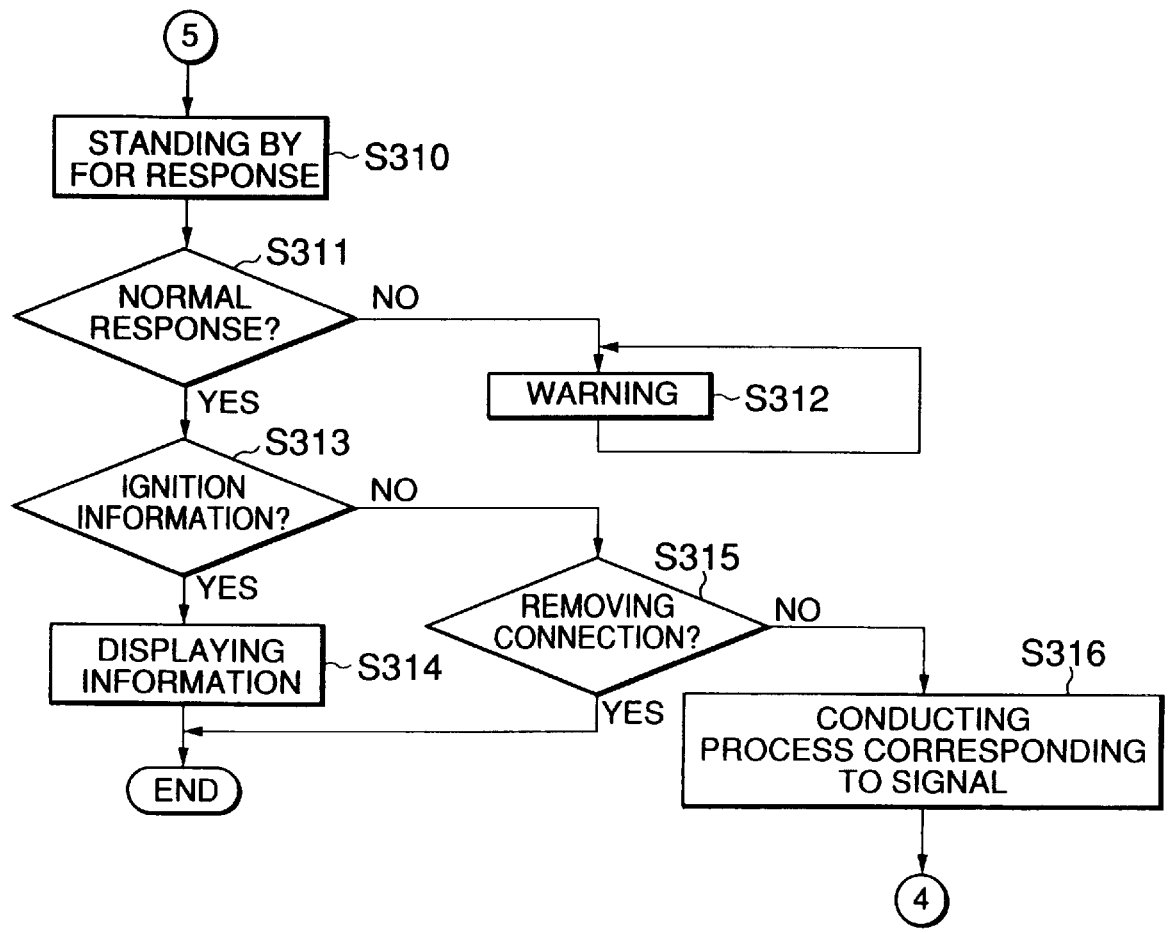

As shown in FIG. 6, the outside control unit 5 stands by a response to the instruction at the next step S310. When the outside control unit 5 receives the response, the outside control unit 5 judges whether the response is normal at the next step S311.

If the response is not normal at the step S311, the outside control unit 5 makes warning means (not shown) give an alarm for mistakes in operating procedures at a step S312. The step S312 is repeated as a loop.

If the response is normal at the step S311, the outside control unit 5 judges whether the response is an ignition information about the inflater 2 at a step S313.

If the response is the ignition information at the step S313, the ignition information is displayed by displaying means (not shown) at a step S314. The controlling steps are then finished.

If the response is not the ignition information at the step S313, the outside control unit 5 judges whether the response is data for removing the connection between the inside control unit 3 and the outside control unit 5 at a step S315. If the response is the removing data at the step S315, the controlling steps are finished. If the response is not the removing data at the step S315, a process corresponding to the response is conducted at a step S316 and the outside control unit 5 repeats the steps from the step S305 (see FIG. 5).

Operating steps for discarding the air bag in the above embodiment will be described hereafter.

It is confirmed that the switches such as the ignition switch 21 of the car and the main switch 45 in the outside control unit 5 are all off. The inside control unit 3 is connected with the outside control unit 5 placed away from the car via the cables.

The main switch 45 is turned on to supply the electric power to the inside control unit 3. When it is confirmed that both the inside control unit 3 and the outside control unit 5 are normally operated, the normally-open switch 46 is turned on. The ignition instruction is inputted from the keyboard 40, so that the inflater 2 is ignited to inflate the air bag. The inside control unit 3 makes the FE-PROM 9 store the ignition information indicating that the inflater 2 has been operated.

The inflation of the air bag and the sending of the ignition information to the outside control unit 5 are confirmed. Thus the air bag, the inflater 2 and the inside control unit 3 or the like are removed from the car to finish the operating steps for discarding the air bag.

If the air bag is inflated by a collision, it is confirmed that the ignition switch 21 is off and the EE-PROM 9 stores the ignition information indicating that the inflater 2 has been operated. Thus the air bag, the inflater 2 and the inside control unit 3 or the like are removed from the car to finish the operating steps for discarding the air bag.

As mentioned above, the inside control unit 3 in the embodiment makes the EE-PROM 9 store the ignition information. Therefore, in the control unit for the air bag 1 including the inside control unit 3 having ever operated the inflater 2, the warning lamp 4 can be lighted on the basis of the ignition information when the ignition switch 21 is turned on. Thus the drivers or the operators can know whether the switch devices in the inside control unit 3 may have little reliability because of the damage with the large electric currents at igniting the inflater 2. Therefore the reuse of the control unit having ever operated the inflater 2 can be surely prevented. This leads to the very improved reliability of the air bag system.

The EE-PROM 9 can be replaced with an assembly comprising an electric driving circuit, a fuse and a circuit for detecting a current, which can store the ignition information by blowing the fuse as non-volatile storage means.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A control unit for an air bag with an inflater for inflating the air bag, comprising:

control means for igniting and operating said inflater to inflate the air bag;

storage means provided in said control means to store an information of whether said inflater has ever been operated or not; and warning means for giving a warning in accordance with an output of said control means;

wherein said control means drives said warning means when said storage means stores said information so as to avoid said control unit being reused.

2. The control unit for said air bag according to claim 1, further comprising:

outside control unit connectable with said control means through a connector;

wherein said outside control unit has input means to give a signal for igniting and operating said inflater to said control means.

3. The control unit for said air bag according to claim 1, wherein:

said storage means has non-volatile storage means.

4. The control unit for said air bag according to claim 3, wherein:

said non-volatile storage means comprises EE-ROM enabling said information to be electrically written into and erased therefrom.

5. The control unit for said air bag according to claim 1, wherein:

said warning means is provided in an instrument panel of a car.

* * * * *